United States Patent [19]
DuMars et al.

[11] Patent Number: 5,741,339
[45] Date of Patent: Apr. 21, 1998

[54] VERTICAL WALL PLANTER

[76] Inventors: Paul H. DuMars; Jennifer L. DuMars, both of 44105 Dahlia St., Lancaster, Calif. 93535

[21] Appl. No.: 721,884

[22] Filed: Sep. 27, 1996

[51] Int. Cl.⁶ .................................................. E04B 1/34
[52] U.S. Cl. ........................... 8/611; 52/611; 52/599; 47/83
[58] Field of Search ................... 52/599, 611, 608, 52/609, 604, 605, 73, 405.1–405.4; 47/66 R, 82, 83, 39, 40

[56] References Cited

U.S. PATENT DOCUMENTS

| | | |
|---|---|---|
| 2,513,711 | 7/1950 | Cain . |
| 3,449,878 | 6/1969 | Hern . |
| 4,123,881 | 11/1978 | Muse ............................... 52/611 X |
| 4,190,384 | 2/1980 | Neumann ......................... 52/609 X |
| 4,320,596 | 3/1982 | Wirtz . |
| 4,658,541 | 4/1987 | Haile ............................... 47/83 |
| 4,738,059 | 4/1988 | Dean, Jr. . |
| 4,745,720 | 5/1988 | Taylor ............................. 52/405.1 |
| 4,798,499 | 1/1989 | Yamada ........................... 47/83 X |
| 4,802,320 | 2/1989 | Forsberg . |
| 4,856,248 | 8/1989 | Larson et al. ..................... 52/405.1 |
| 4,896,456 | 1/1990 | Grant .............................. 47/83 X |
| 4,920,712 | 5/1990 | Dean, Jr. . |
| 5,072,566 | 12/1991 | Zeidman ......................... 52/604 X |
| 5,214,898 | 6/1993 | Beretta ........................... 47/82 X |
| 5,269,095 | 12/1993 | Heffman et al. . |
| 5,299,384 | 4/1994 | Andrews . |
| 5,400,561 | 3/1995 | Metten . |
| 5,457,926 | 10/1995 | Jensen . |

FOREIGN PATENT DOCUMENTS

| | | | |
|---|---|---|---|
| 0322668 | 7/1989 | European Pat. Off. . | |
| 2561684 | 9/1985 | France ............................ | 47/83 |
| 2701673 | 7/1978 | Germany ........................ | 47/83 |
| 3303144 | 8/1984 | Germany ........................ | 47/83 |
| 3420037 | 12/1985 | Germany . | |

*Primary Examiner*—Lanna Mai

[57] ABSTRACT

A built-in cantilevered open topped hollow to allow for the diverse advantage of planted foliage on new or pre-existing vertical wall constructs.

8 Claims, 5 Drawing Sheets

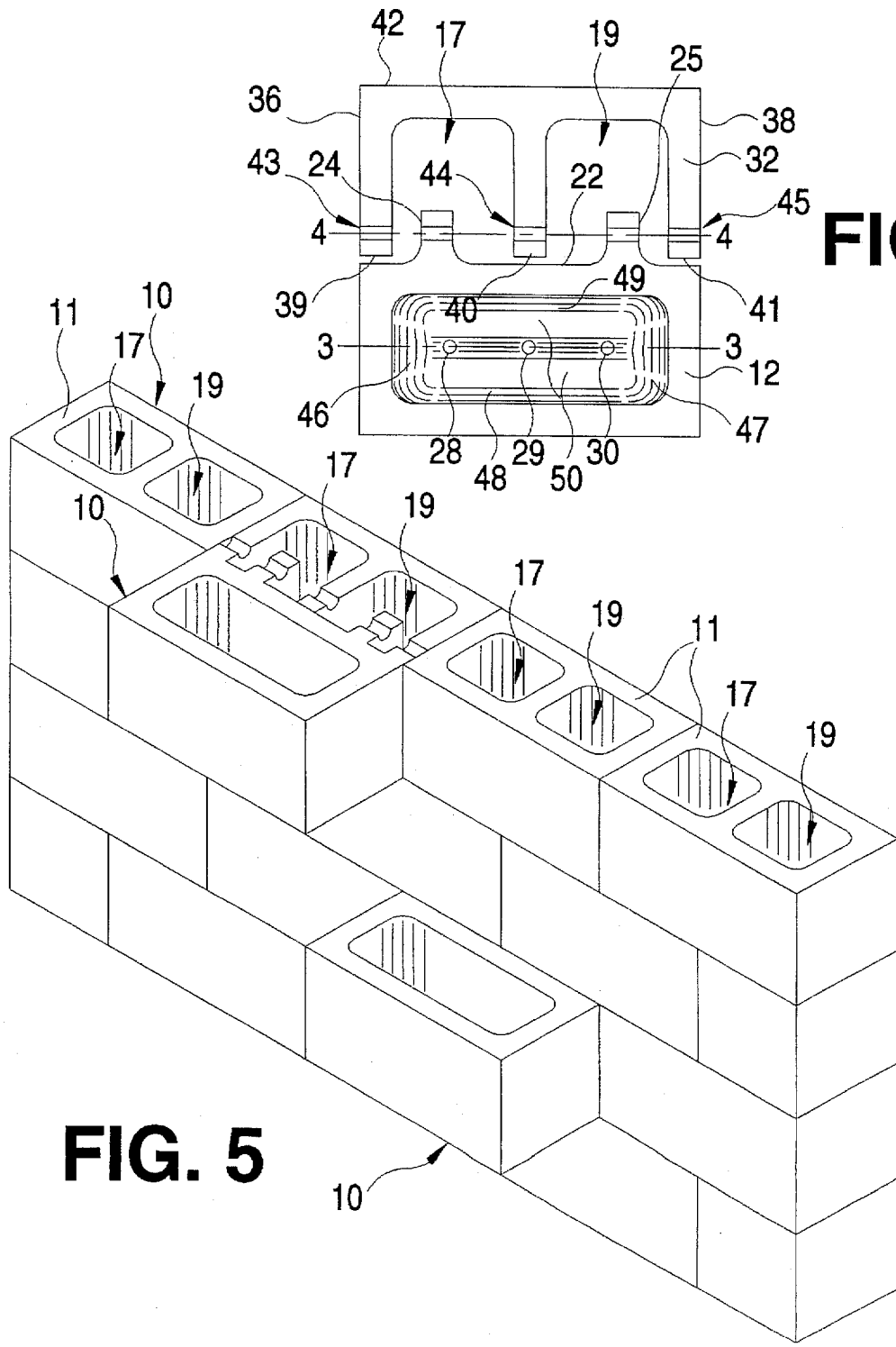

VERTICAL WALL PLANTER

BACKGROUND OF THE INVENTION

1. Field of the Invention

This invention relates in general to cementitious, or other constructive material building blocks. More specifically the present invention particularly relates to cementitious, or other constructive material building blocks in relation to planters, to enable the landscaping of vertical wall constructs.

2. Description of Related Art

Vertical walls are broadly utilized in many different ways from load bearing to divisional designation. Building blocks have been made in a variety of forms and configurations in an effort to provide a decorative appearance when a wall is constructed using such blocks. However once the orientation, size and style of common art blocks which are available today has been selected, the resulting constructed wall has reached the limit of individualization from similarly constructed walls built of like materials. In the current era of mass produced houses and master planned communities, houses have a uniform appearance, are built too close together and lot sizes are very small. In these situations homeowners strive to create individuality within their uniform neighborhoods, while complying within restrictive association guidelines. As a result, I have designed a way to embellish vertical walls using a plantable block with a "built-in" appearance. The Vertical Wall Planter, the present invention, will offer unique customization and individuality from walls constructed or to be constructed with existing block textures, colors and sizes available to date. In order to provide background information so that the invention may be completely understood and appreciated in it's proper context, reference is made to a number of prior art patents as follows:

1. The Dean, Jr. U.S. Pat. No. 4,738,059 "SPLIT MASONRY BLOCK, BLOCK WALL CONSTRUCTION, AND METHOD THEREFOR" Patented Apr. 19, 1988 Whereas a masonry block is formed of concrete-like material with primary and secondary split surface areas. The split masonry blocks are then laid up in courses to form a masonry wall providing a plurality of surface areas of different depths for a random decorative appearance. This Patent is referenced to exemplify as one example of currently available decorative common art wall block.

2. The Forsberg U.S. Pat. No. 4,802,320 "RETAINING WALL BLOCK" Patented Feb. 7, 1989 Whereas retaining walls are made from a plurality of blocks arranged in rows superimposed on each other and pinned together. Each block has an attractive and decorative exterior face comprised of several specified designs, colors and textures. The body and neck of each retaining wall block contains upright openings which will accommodate dirt fill to facilitate the retention of the wall blocks in an earth embankment. This particular system can receive planted material within these earth-filled openings to further embellish the intended design.

3. The Dean, Jr. U.S. Pat. No. 4,920,712 "CONCRETE RETAINING WALL BLOCK, RETAINING WALL AND METHOD OF CONSTRUCTION THEREFOR" Patented May 1, 1980 Whereas a specially constructed block is described to construct a mortarless retaining wall using an engagement clip within each block core and earth backfill in order to increase the resistance of the blocks to rotational forces within the retaining wall construct. The above Patents are two examples of retaining wall systems which could provide plantable areas, however only by virtue of the soils retained within their cells. There is no mention of planting possibilities within their respective Patent filings.

4. The Jensen U.S. Pat. No. 5,457,926 "INTERLOCKING BLOCK" Patented Oct. 17, 1995 Whereas the invention relates to lightweight, non-cementious, resilient, plastic foam interlocking building block composition materials and is referenced for an alternate common art building block composition materials.

5. The Bircher U.S. Pat. No. 3,449,878 "BUILDING BRICKS OR BLOCKS AND STRUCTURES UTILISING THE SAME" Patented Jun. 17, 1969 Whereas building bricks and blocks contain flanges or lugs at each outer wall and at each cell partition, creating an interlocking system for the construction of partition and structural walls. The preferred composition of this invention is a plastics material such as rigid polyvinylchloride or polystyrene, utilizing alternate brick or block composites other than commonly known concretious materials. This Patent is referenced as one example of interlocking blocks restricted to a closed system that requires like-blocks to build a vertical structure, and bears no similarity to an interlocking system for support of a cantilevered module.

6. The Wirtz U.S. Pat. No. 4,320,596 "PLANTER FORMED OF CONCRETE OR A SIMILAR SETTABLE MATERIAL" Patented Mar. 23, 1982 Whereas the planter is free-standing with symmetrical exterior projections enabling certain geometrical configurations when grouped accordingly, providing multiple landscape and hardscape aesthetic variations. While this is a decorative and versatile planter system, it requires a tremendous amount of space when grouped together, limiting it's use to large, private estates, commercial properties and public areas.

7. The Metten U.S. Pat. No. 5,400,561 "CONCRETE BLOCKS HAVING THROUGH HOLES FOR WATER DRAINAGE" Patented Mar. 28, 1995 Whereas concrete blocks or particularly, concrete pavers are perforated with 5 to 20 mm through-holes in order to prevent surface pooling. The intention of the through-holes in this invention are not of the same function as described in the present invention.

8. The Helfman et al U.S. Pat. No. 5,269,095 "PLANTER MOUNTING ASSEMBLY" Patented Dec. 14, 1993 Whereas a planter and mounting assembly is illustrated and comprised of a one-piece planter molded of appropriate plastic or synthetic resin material and affixed on top of or alongside the top rail of a railing. The mounting assembly is primarily comprised of brackets, bolts and bushings in which the planter along with the mounting assembly can be removed or relocated as desired. However, this system does not create a "built-in" appearance, wherever affixed.

Whatever the precise merits, features and advantages of the above cited references, none achieve or fulfill the purpose of the Vertical Wall Planter, the present invention.

SUMMARY OF THE INVENTION

It is the principle object of the present invention to provide a greater versatility in the embellishment of new or existing vertical wall constructs, enhancing their appearance and functionality. The present invention is comprised of cementitious, or other constructive materials which exhibits a protruding, cantilevered, open topped hollow to allow for the diverse advantages of planted foliage on vertical wall constructs.

BRIEF DESCRIPTION OF THE DRAWINGS

By way of example, embodiments of the invention will now be more accurately described with reference to the accompanying drawings, in which:

FIG. 4 A top view of the Modules of FIG. 1 and FIG. 3.

FIG. 5 An oblique view of a wall constructed utilizing two of the Modules of FIG. 4.

DETAILED DESCRIPTION OF THE INVENTION

Figure 1:
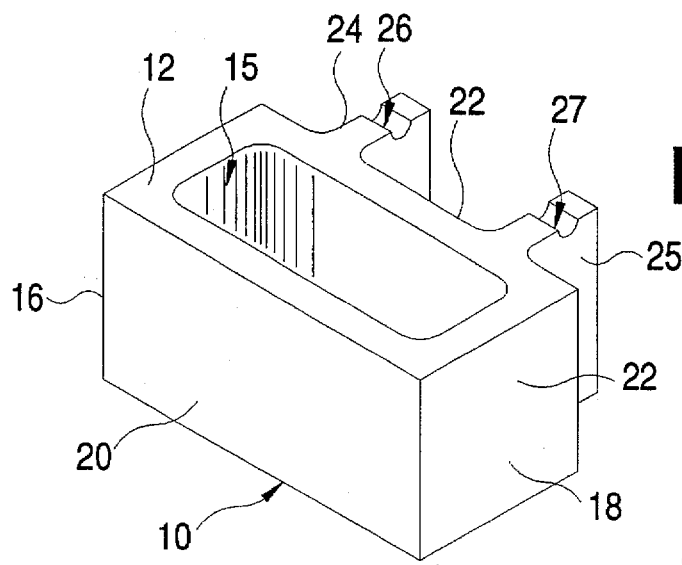
FIG. 1 An oblique view of the Planter Portion of the Preferred Embodiment of the Invention.
Figure 2:
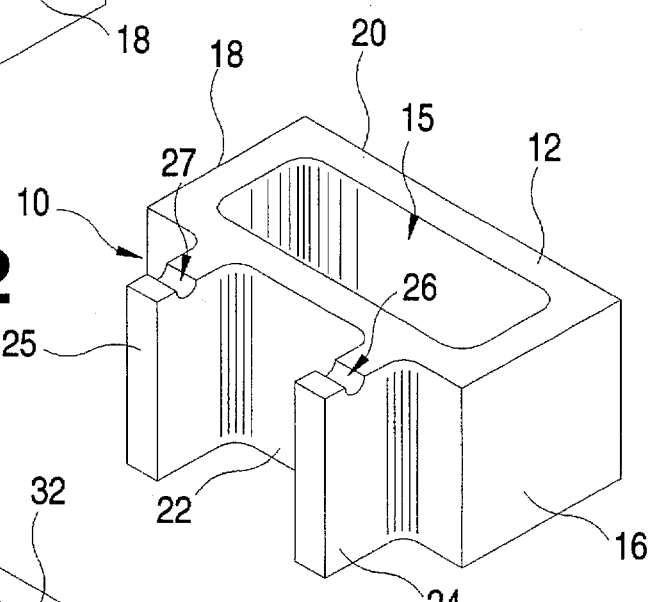
FIG. 2 Rear oblique view of the Module of FIG. 1.
Figure 3:
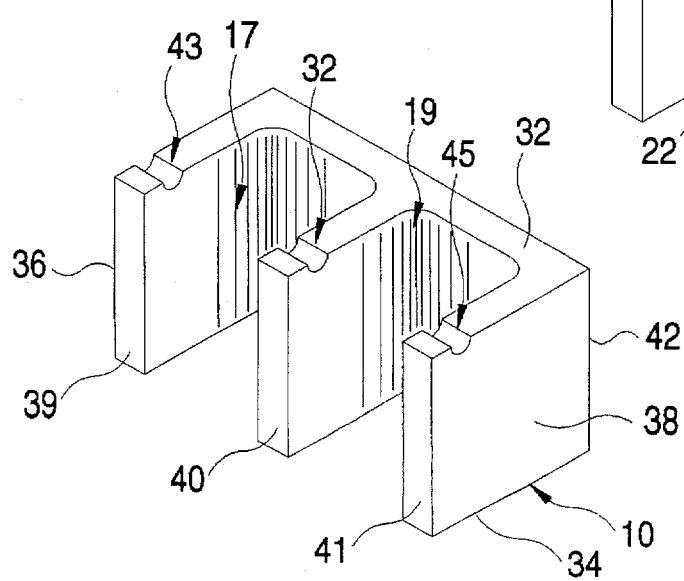
FIG. 3 A front oblique view of the Support Portion of the Preferred Embodiment of the Invention.

For the Primary Embodiment of the Invention, refer to FIG. 1 through FIG. 5 wherein a Module 10 is shown comprising a planter portion having a body with a substantially flat top horizontal planar surface 12, a substantially parallel bottom horizontal planar surface 14, a generally flat front vertical surface 20, a substantially perpendicular left side vertical surface 16, a substantially parallel right side vertical surface 18, a generally flat rear vertical surface 22, that is substantially parallel to the aforementioned front vertical surface 20, two protruding vertical walls 24 and 25 are annexed to the aforementioned rear vertical surface 22 and are substantially perpendicular to the aforementioned rear vertical surface 22, protruding vertical walls 24 and 25 have perpendicular vertical indentations 26 and 27 respectively, heretofore referred to as support grooves 26 and 27 and are longitudinally aligned, as shown by the line 4—4 of FIG. 4, and indented hollow, 15 heretofore referred to as planter cell 15 comprising an interior front vertical surface 48 which is the interior surface of the interposed wall having front vertical surface 20 as an exterior limit, an interior rear vertical surface 49 which is the interior vertical surface of the interposed wall having rear vertical surface 22 as an exterior limit, left side interior vertical surface 46 which is the interior surface of the interposed wall having left side vertical surface 16 as an exterior limit, interior right side vertical surface 47 which is the interior vertical surface of the interposed wall having right side vertical surface 18 as an exterior limit, bottom interior surface 50 which is the interior surface of the interposed wall having bottom horizontal planar surface 14 as an exterior limit wherein in relation to aforementioned bottom horizontal planar surface 14 bottom interior surface 50 declines angularly from the planar intersections with front interior vertical surface 48 and rear interior vertical surface 49 to a low line bisecting drainage holes 28, 29 and 30 represented by longitudinal axis line 3—3 of FIG. 4. Also shown is the Support Portion of the Module 10 comprising a body having a substantially flat top horizontal planar surface 32, a substantially parallel bottom horizontal planar surface 34, a substantially perpendicular rear vertical surface 42 which is the exterior limit of an interposed wall to which the interior surface has annexed three substantially perpendicular vertical walls each wall having a front vertical surfaces on the same vertical plane, the left side vertical wall having front vertical surface 39 and the right side vertical wall having front vertical surface 41 are annexed at opposing ends and the vertical wall having front vertical surface 40 is equidistantly centered between, all three walls being substantially parallel, left, center and right vertical walls having perpendicular vertical indentations 43, 44 and 45 respectively, heretofore referred to as support grooves 43, 44 and 45 which are in longitudinal alignment. The aforementioned Support Portion of the Module 10 is mortar set in common form known to the art of the present invention with rear vertical surface 42 on a horizontal plane with the rear vertical surface of the recipient wall as shown in FIG. 5, the aforementioned Planter Portion of the Module 10 is set with rear vertical surface 22 adjoining front vertical surfaces 39, 40 and 41 of the aforementioned Support Portion and with top, bottom and side surfaces of both portions in planar alignment, aforementioned support grooves 26 and 27 of the aforementioned Planter Portion and aforementioned support grooves 43, 44 and 45 of the aforementioned Support Portion are longitudinally aligned represented by line 4—4 of FIG. 4, an appropriate size pre-cut length of common reinforcing steel, known to the art, is set into the aligned support grooves, locking Support and Planter Portions into a single built-in module, due to the two piece construction the aforementioned Support Portion of the Module 10 can be made to match the common art blocks 11 of the recipient wall, leaving the non-planter side of the wall visually unaltered and giving the aforementioned Planter Portion diverse options in color, shapes, materials and methods of manufacture. A plurality of common art block are shown in FIG. 5 wherein vertically redundant staggered rows are mortar set in common form known to the art, two of the Modules 10 are installed, the top one shown at installation and the lower as it appears in the finished wall, some different embodiments would vary from this example in appearance, however all concretious rectilinear embodiments of the present invention would have the same finished wall appearance. For the Second Embodiment of the Invention, refer to FIG. 6 through FIG. 8 wherein a Module 10a is shown, comprised of a Portion represented by an implied vertical bisecting plane is taken from the longitudinal axis line 5—5 of the top planar surface 52 to longitudinal axis line 6—6 of the bottom planar surface 54 (of FIG. 2), the portion contained between this vertical plane and the rear vertical surface 62, heretofore referred to as the Common Art Portion of Module 10a, is similar in shape, relative size and material content to currently available common art building block, used for constructing overlapping vertically stacked horizontal rows, mortar bonded in common fashion used in the construction of walls and structures. And also comprising a portion contained within the aforementioned bisecting plane to the front vertical surface 60, wherein is shared a top planar surface 52, a substantially parallel bottom planar surface 54, a right side vertical surface 58 and a substantially parallel left side vertical surface 56 and though these surfaces are shared with the Common Art Portion of the Module 10a, when installed into a wall comprised of blocks of a similar type to the aforementioned Common Art Portion of the Module 10a, the front vertical surface of aforementioned constructed wall is on a plane with the aforementioned bisecting plane and the Common Art Portion of the Module 10a, the portion from the aforementioned bisecting plane to front vertical surface 60 protrudes in a cantilevered fashion from this surface wherein contained is a single enclosed bottom hollow cell 55, hereafter referred to as planter cell 55, providing a container which projects from the wall surface, suitable for the placement of soil and plantable material which will be heretofore referred to as the Planter Portion of the Module 10a. These Modules 10a can be placed anywhere within a wall in patterns, clusters or at random dependent only on aesthetic interest without negative affect of the wall's structural integrity. It can be manufactured on current technology block production machinery or can be made of other durable construction materials including, but not limited to ceramic, metal, plastic, reinforced catalytic resins, fired clay or wood, although some of these materials may not meet structural requirements in all applications. The blocks can be made to match any existing style, color, texture and size of current technology block manufacture. The Common Art Portion of the Module 10a should be produced in size and dimension, in accordance with blocks of a similar type of the recipient wall for the purpose of the uniformity required for masonry constructs built of like elements.

Figure 6:
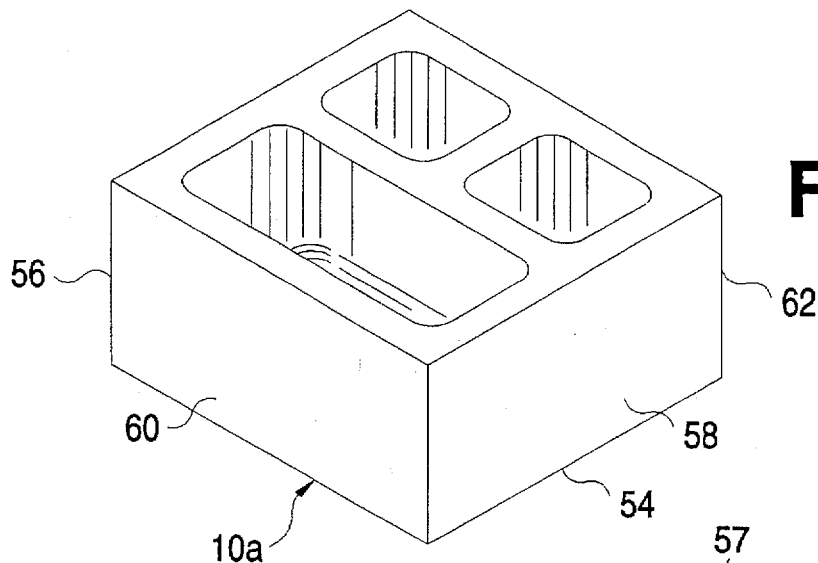
FIG. 6 An oblique front view of the Second Embodiment of the Invention.
Figure 7:
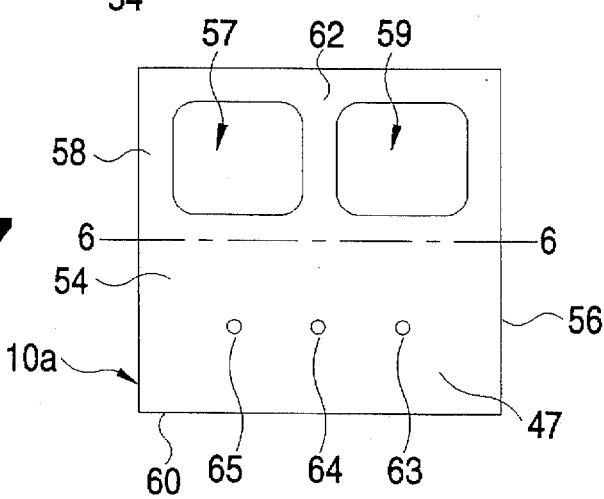
FIG. 7 A bottom view of the Module of FIG. 6.
Figure 8:
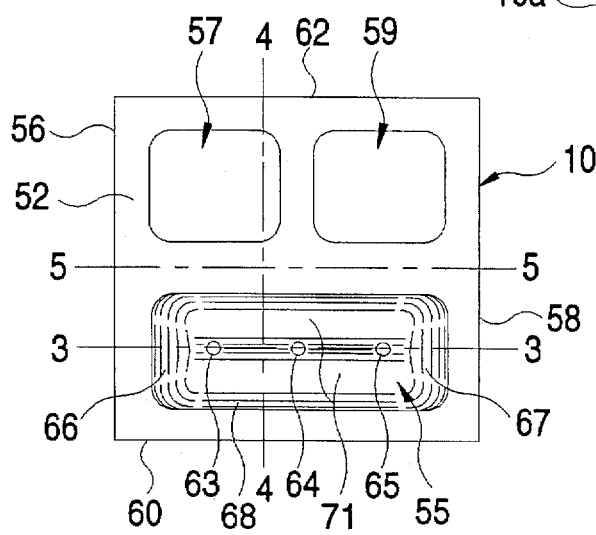
FIG. 8 Top view of the Module of FIG. 6.
Figure 9:
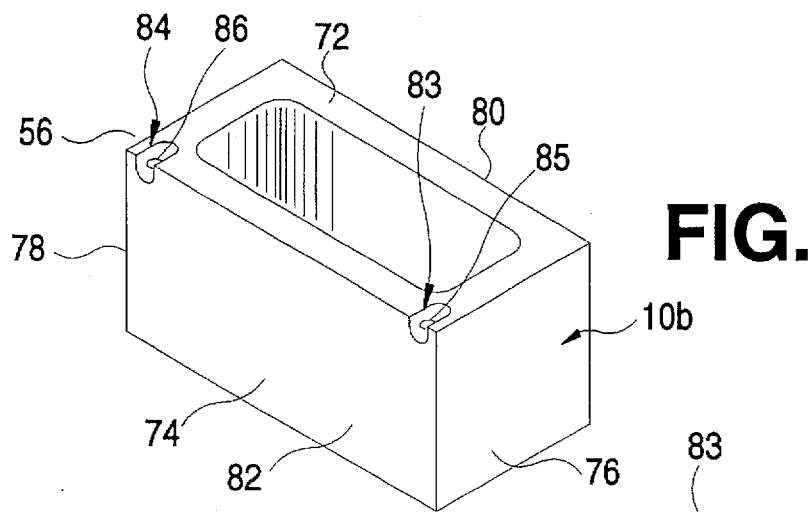
FIG. 9 An oblique rear view of the Third Embodiment of the Invention.

However, the Planter portion of the Module 10a can be produced in a variety of shapes including, but not limited to semi-circular, chamfered or diagonal cut corners with the only exception being certain methods of manufacture will not lend themselves easily to some geometrical constructs. The Common Art Portion through-holes are shown (from a frontal view) as in FIG. 6 with the left side through-hole 57 and the right side through-hole 59 provided for purposes common to the present art for weight reduction and to furnish a connected vertical passage suitable for reinforcing bar and grout fill when staggered horizontal rows are superimposed vertically. Smaller through-holes 63, 64 and 65 are shown in FIG. 7 and FIG. 8 providing escape for excess moisture within the planter cell 55, heretofore to be referred to as drainage holes 63, 64 and 65. The planter cell 55 is generally geometrically shaped similarly to the Planter Portion of the Module 10a however proportionately smaller in dimension to allow sufficient wall thickness for structural integrity. In concretious embodiments as shown in FIG. 6, FIG. 7, and FIG. 8 the internal surface intersections are radiused. The planter cell 55 as shown in FIG. 8 is comprised of a left internal vertical surface 66 which is the internal vertical surface of the wall having left vertical surface 56 as an exterior limit, wherein these surfaces are substantially parallel. A right internal vertical surface 67 which is the vertical internal surface of the wall having right vertical surface 58 as an exterior limit, wherein these surfaces are substantially parallel. A front internal vertical surface 68 which is the internal vertical surface of the wall having front vertical surface 60 as an exterior limit, wherein these surfaces are substantially parallel. A rear internal vertical surface 69 that is substantially parallel to the aforementioned implied bisecting plane of 5—5 to 6—6. A bottom surface 70 and 71 wherein in relation to bottom horizontal planar surface 54 both decline at an angle from the line of intersection with front internal vertical surface 68 and rear internal vertical surface 69 respectively to transverse line 3—3 wherein transverse line 3—3 represents the planter cell 55 internal surface low line, as a line bisecting drainage holes 63, 64 and 65 and extending from left internal vertical surface 66 to right internal vertical surface 67. The aforementioned Common Art Portion of the Module 10a is mortar set in common fashion of typical concretious building blocks differing only in the need for support of the cantilevered Planter Portion until subsequent courses can be set above, refer to FIG. 9 and FIG. 10, a Module 10b is shown representing a third embodiment of the present invention comprised of a top horizontal planar surface 72, a substantially parallel bottom horizontal planar surface 74, a left side vertical surface 76, a substantially parallel right side vertical surface 78, a front vertical surface 80, a substantially parallel rear vertical surface 82, a planter cell 75, drainage holes, internal vertical surfaces, and internal bottom surfaces are not shown on this embodiment as the planter cell 75 is in size and geometry substantially similar to the aforementioned planter cell 15 of the Module 10 of FIG. 4. Also shown are indentations 83 and 84 and holes 85 and 86 heretofore referred to as mounting holes 85 and 86 said mounting holes are utilized by being partially filled with a non-shrinking pourable cement or masonry compatible catalytic resin then in each mounting hole is inserted vertically to mid point an appropriate diameter cut-to length piece of common reinforcing steel, known to the art of the present invention, that is bent at approximate mid-point to a ninety degree angle wherein the exposed portions of the aforementioned reinforcing steel protrude horizontally and substantially perpendicular to aforementioned rear vertical surface 82, appropriate diameter holes are then drilled, in horizontal alignment, in the vertical recipient surface at a distance determined by that of the aforementioned protruding reinforcing steel each hole is partially filled with the aforementioned bonding material, the aforementioned rear vertical surface 82 is then mortar scored around the perimeter then installed horizontally with the aforementioned reinforcing steel penetrating the aforementioned drilled holes to a distance from the aforementioned recipient surface to attain compression of the aforementioned mortar, the Module 10b is then temporarily supported until bonding material is set. The embodiment of the Module 10b is shown in concretious form, however can be manufactured of other durable substances including, but not limited to fired clay, manufactured stone, wood, metal, plastic, fiber reinforced catalytic resins or ceramics. The Vertical Wall Planter Module 10b can be manufactured by current technology block production machinery and due to the retrofit installation procedure, the non-planter surface of the recipient wall is unchanged, allowing this embodiment to be readily suited to a wide variety of geometric shapes, colors, textures, materials and methods of manufacture which fall within the scope of this inventive concept. Referring to FIG. 11 the Module 10c is shown as a variation of the third embodiment of the present invention shown in FIG. 9 and FIG. 10 with planter cell 95 comprised of internal vertical surfaces 104, 105 and 106 which are substantially parallel to external vertical surfaces 96, 98 and 100 respectively which are the exterior limits of the walls interposed within and internal bottom surface 108 which is the internal surface of the wall that has bottom horizontal planar surface 94 as an exterior limit, an interior diagonal surface 107 which is the interior surface of the interposed wall of which exterior diagonal surface 93 is the exterior limit existing as an angular planar surface equi-angularly connecting font vertical surface 100 and bottom horizontal planar surface 94 also shown are drainage holes 109, 110 and (111) as are indentations 87 and 88 and mounting holes 89 and 90 which correlate in size, placement and installation procedure to aforementioned indentations 83 and 84 and mounting holes 85 and 86 of the Module 10b of FIG. 9 and FIG. 10.

Figure 10:
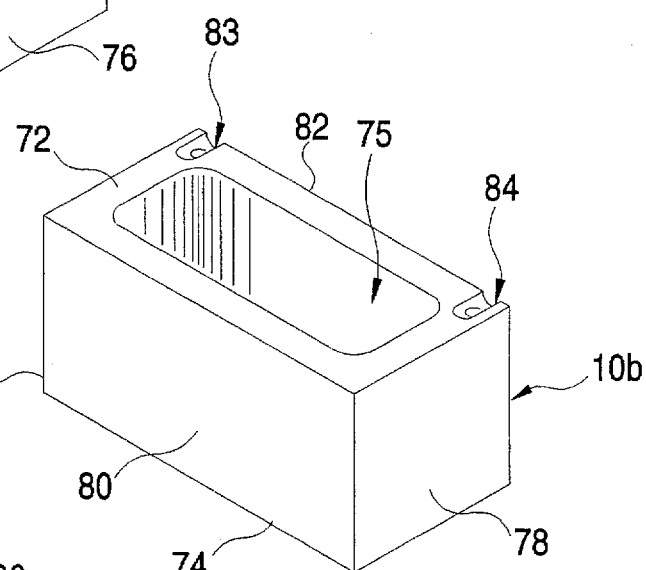
FIG. 10 An oblique front view of the Module of FIG. 9
Figure 11:
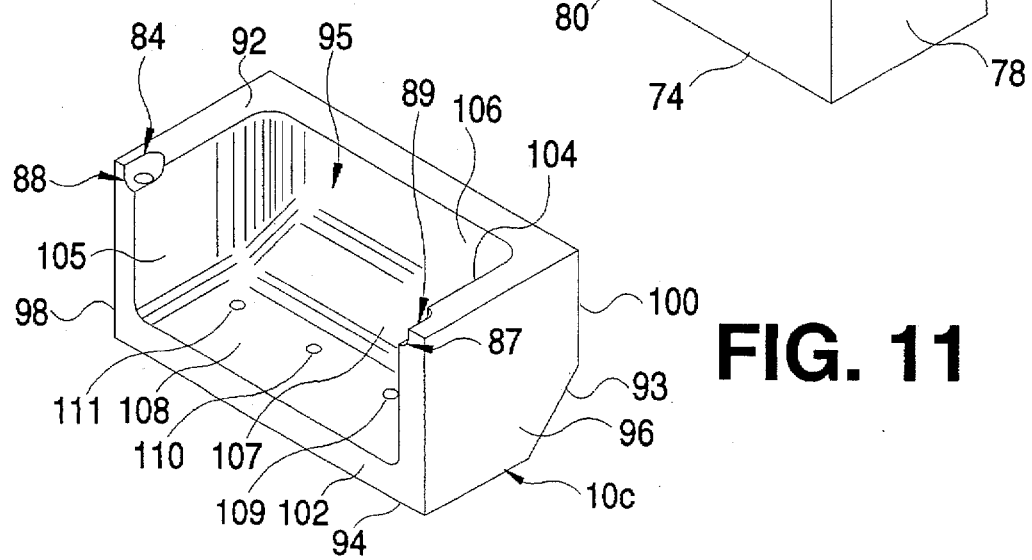
FIG. 11 An oblique rear view of a secondary alteration of the Module of FIG. 9.
Figure 12:
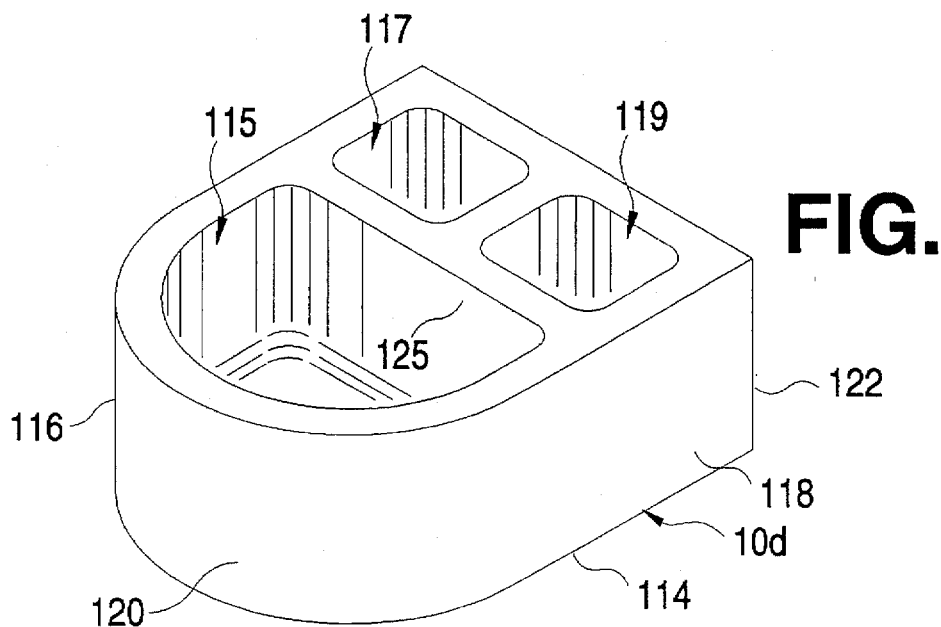
FIG. 12 An oblique front view of the Fourth Embodiment of the Invention.
Figure 13:
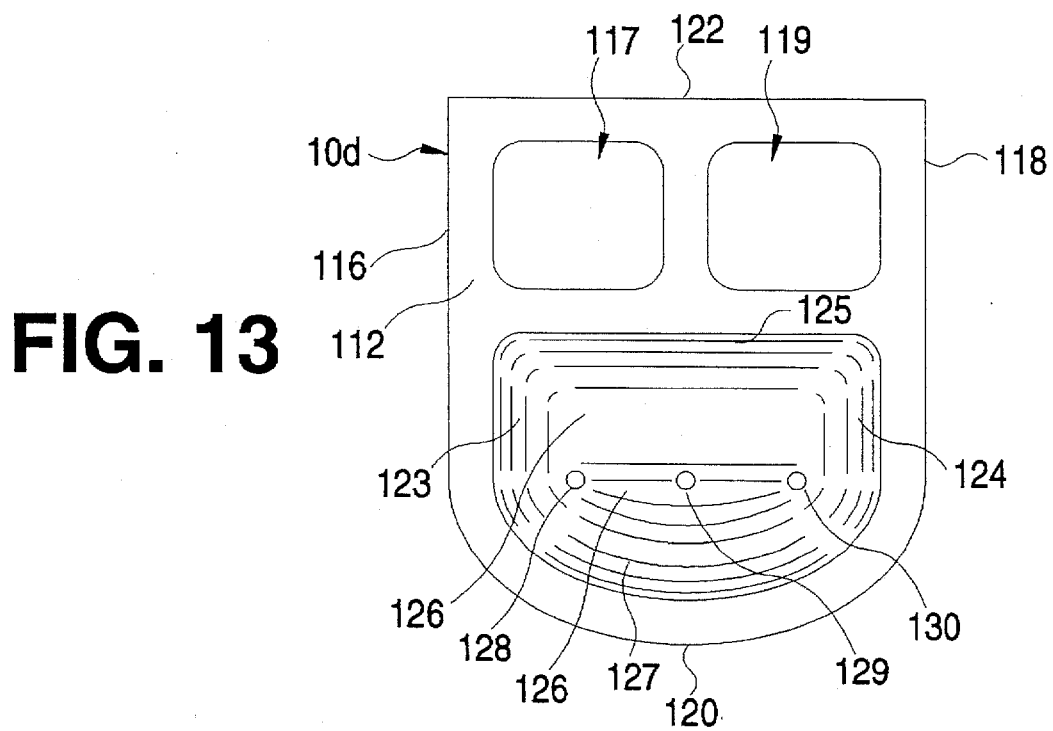
FIG. 13 A top view of the Fourth Embodiment of the Invention.

For the Fourth Embodiment of the Invention, refer to FIG. 12 and FIG. 13 FIG. 10 a Module 10d is shown comprising a substantially flat top horizontal planar surface 112, a substantially parallel bottom horizontal planar surface 114, a generally flat rear vertical surface 122, a substantially perpendicular left side vertical surface 116, a substantially parallel right side vertical surface 118 both aforementioned side surfaces connected by a radiussed front surface 120, two common art style through holes 117 and 119 and an indented hollow 115 heretofore referred to as planter cell 115, comprising internal vertical surfaces 123, 124 and 127 which are the interior limits of the interposed planter cell walls having exterior vertical surfaces 116, 118 and 120 respectively as an exterior limit and internal vertical surface 125 which is the interior surface of the wall separating the aforementioned planter cell 115 and the common art style through holes 117 and 119 and is generally parallel to rear vertical surface 122. Also shown is interior bottom surface 126 which declines at an angle from the planar intersections with front interior vertical surface 127 and rear interior vertical surface 125 to a low-line intersecting drainage holes 128, 129 and 130. The Module 10d is shown in concretious form however can be constructed of other durable materials such as, but not limited to ceramic, clay, manufactured stone or metal in concretious form it can be produced on current technology block production machinery or produced as a molded product.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The embodiments of the invention presented in which an exclusive property or privilege is claimed are defined as follows:

1. A built-in cantilevered planter block comprising:

a cantilevered planter body having a front, back and side walls each having an exterior and interior surfaces, wherein each said exterior surface is parallel to a respective interior surface; said walls defining a hollow therebetween;

said planter body further includes a substantially flat top surface, a substantially parallel exterior bottom surface, and a generally non-parallel interior bottom surface declining from said front and back walls toward a longitudinally centered low line intersecting a plurality of weep holes;

said front, back, bottom and side walls having a thickness determined by maximum hollow interior area;

a plurality of protruding vertical mounting walls being formed on said back wall and extending away from said planter body; said mounting walls spanning the distance from said top surface to said bottom surface; said mounting walls comprising top surfaces each of which being indented with a vertical groove; said grooves are positioned at the end portion of the mounting walls away from said planter body;

a support module for said planter body comprising a generally rectilinear body defining an open-faced unit; said support module includes a rear wall and three generally parallel vertical walls formed integrally with said rear wall and extending perpendicular therefrom; one of said vertical walls is positioned at each end of said rear wall and one said vertical walls is positioned at the center of said rear wall; a second groove is formed on the end portion of each vertical wall away from said rear wall;

said planter body is connected to said support module such that said mounting walls of said planter body being interposed to said three vertical walls of said support module, and all the grooves are aligned to receive a reinforcing rod;

said planter block is adapted to be set between a plurality of blocks of a wall, wherein the exterior face of said rear wall of said support module is adapted to be flush with one of the vertical faces of the wall, and said planter body is adapted to extend outwardly beyond the other vertical face of said wall.

2. The built-in cantilevered planter block of claim 1, wherein said rear wall has a generally flat exterior surface and is adapted to be mortar set to the faces of the blocks of a wall and the planter body protrudes from the wall.

3. The built-in cantilevered planter block of claim of 2, wherein said planter block has a substantially non-linear face.

4. The built-in cantilevered planter block of claim 2, wherein said planter block has beveled edges.

5. The built-in cantilevered planter block of claim 2, wherein said planter block is made of cementitious material.

6. The built-in cantilevered planter block of claim 1, wherein said planter block has beveled edges.

7. The built-in cantilevered planter block of claim 1, wherein said planter block has a generally rectilinear shape.

8. The built-in cantilevered planter block of claim 1, wherein said planter block is a hardened granular amalgam.

* * * * *